United States Patent [19]
Mann

[11] 3,811,374
[45] May 21, 1974

[54] COOKING APPARATUS
[75] Inventor: Douglas G. Mann, Boston, Mass.
[73] Assignee: Clambake International, Incorporated, Cambridge, Mass.
[22] Filed: Feb. 16, 1973
[21] Appl. No.: 333,303

[52] U.S. Cl............... 99/341, 99/426, 99/446, 99/449, 99/450, 126/369
[51] Int. Cl. .................................. A47j 27/04
[58] Field of Search ...... 126/348, 369; 99/341, 403, 99/418, 426, 444, 446, 449, 450

[56] References Cited
UNITED STATES PATENTS
| | | | |
|---|---|---|---|
| 2,488,215 | 11/1949 | Mayne | 99/341 X |
| 2,818,794 | 1/1958 | Aslesen | 99/341 |
| 3,237,553 | 3/1966 | Fineberg | 99/341 |
| 3,212,426 | 10/1965 | Lewus | 126/369 X |
| 3,489,075 | 1/1970 | O'Reilly | 99/450 |

FOREIGN PATENTS OR APPLICATIONS
| | | | |
|---|---|---|---|
| 6,141 | 11/1910 | Great Britain | 99/449 |
| 440,591 | 1/1936 | Great Britain | 126/348 |

*Primary Examiner*—Billy J. Wilhite
*Attorney, Agent, or Firm*—Chittick, Thompson & Pfund

[57] ABSTRACT

A cooking apparatus designed for a large clambake. The cooking apparatus includes a large bowl-shaped cooking vessel, supporting legs, a burner to heat the cooking vessel, and a flexible inflatable hood affixed to the cooking vessel rim. As the heated broth liquid in the bottom of the vessel changes to steam, the hood inflates to confine and thereby slightly pressurize the broth steam so that it permeates the entire stack of food being cooked.

16 Claims, 3 Drawing Figures

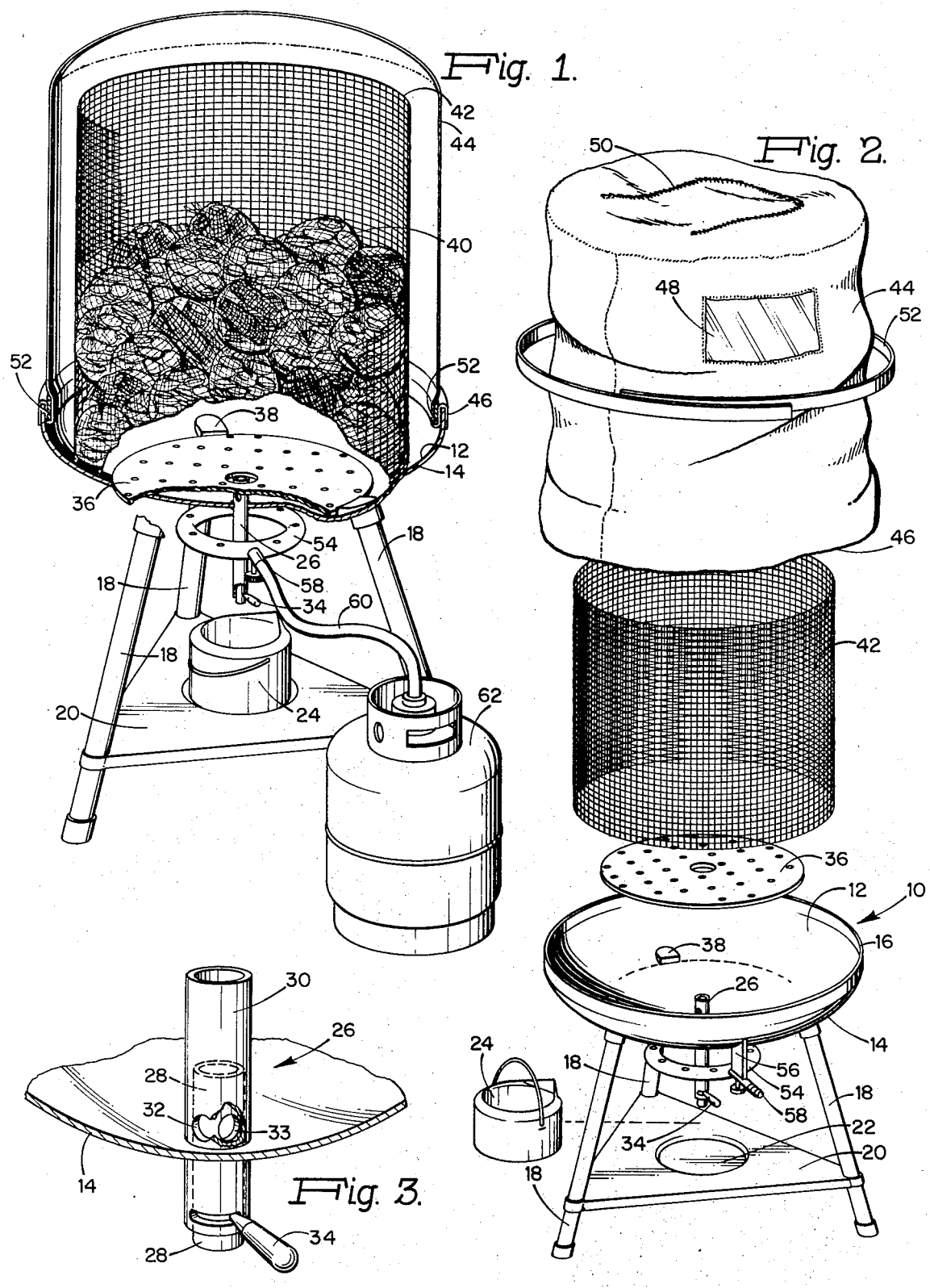

COOKING APPARATUS

BACKGROUND OF THE INVENTION

In the past, holding a typical clambake involved steaming large quantities of clams, lobsters, corn, etc. in covered large, heavy cauldrons, pots, or the like. The cauldrons were usually placed on a grill which was supported over an open wood or charcoal fire.

This method leaves much to be desired. The cauldrons are very heavy and cumbersome to wash and to store or transport. A fire pit must be available or dug specially for the occasion. Wood or charcoal must be brought in for the fire, and building and tending the fire requires time and attention. Also, such fires are hazardous to the clambake participants and to the surrounding area. Finally, the fire must be doused and the charred remains buried or otherwise disposed of.

It is an object of this invention to provide a clambake cooking apparatus that eliminates the need for the fire pit, the wood or charcoal supply, the open fire itself, the grill, and the large, heavy, covered cauldrons.

It is another object of this invention to provide a cooking apparatus that is quite light in weight, that disassembles into a small easily transportable package, and that is economical to manufacture.

It is another object of this invention to provide a clambake cooking apparatus which cooks the food quickly and which has a very large interior volume so that it can accommodate and steam large quantities of food.

SUMMARY OF THE INVENTION

The foregoing objects are attained by this invention which includes a cooking vessel mounted on legs, a burner unit mounted beneath the cooking vessel, and an inflatable hood fixed to the vessel rim. As the heated broth fluid in the vessel bottom turns into steam, the hood inflates and then confines and slightly pressurizes the broth steam so that it completely permeates the stack of food being cooked.

This invention requires no fire pit, on wood or charcoal supply, no open fire, no grill, and no large, heavy, covered cauldrons. The invention eliminates the heavy cauldron cover, yet can cook extremely large quantities of food because of its employment of the flexible, inflatable hood.

DESCRIPTION OF THE DRAWINGS

FIG. 1 is a perspective view, partly broken away, of the cooking apparatus of this invention;

FIG. 2 is an exploded perspective view of the cooking apparatus shown in FIG. 1; and FIG. 3 is a perspective view, partly broken away, of the broth fluid outlet.

DESCRIPTION OF THE PREFERRED EMBODIMENT

FIG. 1 shows the entire cooking apparatus which is specifically designed for use at a clambake, although it would be equally useful for the steaming or frying of other foods, such as hot dogs, baked beans, chicken, shrimp, and the like. FIG. 1 shows a large number of mesh bags containing individual servings of lobsters, clams, corn, etc. stacked for cooking.

Before describing the cooking process, the individual components of the cooking apparatus will now be described in detail. FIG. 2 shows the cooking vessel 10 which has a hollow interior portion shaped to hold liquid. Preferably, vessel 10 has a bowl shape, although it could equally well have a cylindrical shape. The important aspect of the shape of vessel 10 is that it must include a hollow interior portion for holding fluid which can be heated until the fluid becomes steam.

Cooking vessel 10 has an interior surface 12 and an exterior surface 14. In the shown preferred embodiment, interior surface 12 is concave, and exterior surface 14 is convex. Vessel 10 has a rim 16 running around the periphery of the cooking vessel.

The vessel 10 is supported by three legs 18 which are threadably mounted in sockets on the exterior or underside of cooking vessel 10. The three legs 18 are stabilized by a horizontal platform 20 which connects the three legs and holds them firmly in a slightly splayed position.

The platform 20 also has a central depressed portion 22 shaped to accommodate a broth pitcher 24 which is adapted to be positioned beneath a fluid outlet 26. Outlet 26, as shown in FIG. 3, takes the form of two coaxial, open-ended, hollow tubes which are vertically mounted in the bottom of cooking vessel 10. Fluid outlet 26 serves two purposes. One is to continuously prevent the fluid broth level from rising into contact with the food. The other is to permit broth to be withdrawn from the vessel, regardless of its level, at any time. To accomplish the first of these purposes (level control), the outer tube 30 of outlet 26 is open at each end and simply acts as an overflow pipe which has its upper intake end spaced several inches above the lowest point of vessel 10, and has its lower outlet end spaced below the exterior surface 14 of vessel 10. Thus, the fluid level cannot rise higher than the upper intake end because at that height the fluid flows into outer tube 30 and drains into broth pitcher 24.

To accomplish the second of these purposes (selective broth withdrawal), the outer tube 30 has an opening 32 quite near the lowest point in cooking vessel 10. The inner tube 28 has a corresponding opening 33 at the same vertical height. Openings 32 and 33 can be rotated into alignment by means of a valve handle 34 which protrudes through a slot in the outer tube and is fixed to the revolvable inner tube. Thus, broth can be removed from the cooking vessel at any time by simply turning valve handle 34 to draw broth through aligned openings 32 and 33 and downwardly through inner tube 28 into broth pitcher 24.

In order to support the food above the fluid level, a round, apertured, stainless steel, food supporting plate 36 is positioned horizontally on the interior surface 12 of the cooking vessel. Preferably, several positioning shoulders 38 are provided to center the plate 36. Plate 38 has a diameter selected to be sufficiently large so as to cause the plate to be supported in the cooking vessel above the inlet end of fluid outlet 26.

In order to support a large stack of food (e.g. mesh bags 40 containing individual servings of lobsters, clams, corn on the cob, etc.), a food retaining cylinder 42 is placed on end on the interior surface 12 of the cooking vessel. Preferably, cylinder 42 is a rectangular piece of stainless steel meshwork which is rolled into the shape of a cylinder and fastened. The use of a rectangular piece of meshwork permits easier storage and transportability because the rectangular piece can be stored flat or rolled into a tight coil. Cylinder 42 can alternatively be positioned on the interior surface 12 of the cooking vessel or on apertured plate 36. The cylinder prevents the food from spilling over the sides of the cooking vessel and permits a very high food stack to be built.

A flexible, inflatable hood 44 is drawn over cylinder 42, and the mouth 46 of the hood is affixed to the rim 16 of the cooking vessel. Hood 44 is preferably made of a synthetic material, such as nylon, which is washable and which can withstand considerable heat without deteriorating. Nylon also is slightly pourous which is a desirable characteristic for the hood material. The hood is easily foldable for storage and is very flexible to facilitate even inflation during steaming. By "inflation," it is meant that the hood will expand to its maximum interior volume. It is not meant that the hood material itself will stretch.

Optionally, hood 44 can be fitted with a transparent window 48 to permit the cook to better view the food during the cooking process, and a zippered opening 50 in the closed end of the hood to permit the insertion or withdrawal of mesh food bags 40 into or from the cylinder-held food stack.

The mouth 46 of hood 44 is fastened to rim 16 of cooking vessel 10 by means of a resilient coil or band 52 of stainless steel or other sturdy material. Coil 52 is a single length of spring steel which is overlapped upon itself, and is then positioned around the mouth 46 of the hood, as shown in FIG. 2. The mouth of the hood is then drawn over and outside of rim 16 of the cooking vessel, and coil 52 is inserted inside of rim 16, as shown in FIG. 1, to press the hood mouth tightly against the cooking vessel. Obviously, there are many other methods for affixing hood 44 around the cooking vessel which would work satisfactorily. The shown affixing means is inexpensive, fast, simple and effective.

A heating unit is employed to heat the interior of the hooded cooking vessel. Preferably the heating unit includes a burner ring 54 having a plurality of spaced nozzles pointing upwardly. Burner ring 54 is attached to the underside of cooking vessel 10 by means of at least one, and preferably three, struts 56. The burner ring 54 carries a valved fitting 58 which is stepped to securely engage a connecting hose 60. The hose leads to a remotely located propane bottle 62 which has its own valve.

In operation, a clambake is prepared by first setting up the equipment. The legs 18 are screwed into their sockets on the exterior surface 14 of the cooking vessel. Then, the unit is flipped over so that the cooking vessel stands upright, as shown in FIG. 2. Then, the connecting hose 60 is installed to connect propane bottle 62 to valved fitting 58, and the system is tested to insure against the presence of gas leaks.

The apertured plate 36 is placed horizontally in the cooking vessel and the selected liquid is poured into the bottom of the vessel. The selected liquid can be salt water, wine, or a combination of both. Usually, approximately two gallons of liquid are poured into the cooking vessel.

The food is then added to the cooking vessel. All of the food items are preferably packaged in mesh bags 40, each of which contains an individual serving. The bags are piled on the apertured plate 36. If a large clambake is to be prepared, it is necessary to set up the meshwork cylinder 42 which will support a large high stack of serving bags 40. The greater the amount of food to be steamed, the greater the amount of liquid which should be initially poured into the cooking vessel. Seaweed can also be added to impart flavor.

After the food has been stacked in the cooking vessel, hood 44 is pulled over the stack (and over the cylinder 42, if it is used), and the hood mouth 46 is clamped tightly to the cooking vessel rim 16 by coil 52.

The burner ring valve 58 is then opened and the burner is lit. The burner attains a heat level of approximately 75,000 to 170,000 BTU. As the fluid in the bottom of the cooking vessel comes to a boil, a portion of the fluid turns to steam and the hood begins to rise and inflate. After the hood has completely inflated, the steam cooking process reaches its maximum effect.

The hood is not intended to be a perfect gas tight envelope. The steam escapes to a limited extent through the hood material itself, along the joinder line between the hood mouth and the cooking vessel, and out of fluid outlet 26. Thus, the invention does not operate as a pressure cooker, as the term is normally defined. Instead the hood acts to concentrate the steam in the area of the food stack and to slightly raise the steam pressure so that the steam completely permeates the entire food stack.

As the food in the stack cooks, internal fluids bubble out of the clams, lobsters, etc. and cascade down through the bags of food which are lower in the stack. This creates the desired flavor intermixture, and when the downward fluid flow finally reaches the bottom of the cooking vessel, it becomes steam and rises to the top of the stack to begin its downward cycle again. It will be noted that the broth is a mixture of the originally added fluids and the internal liquids from the food.

The cook can determine when the clambake is done by tasting the broth, by observing the color of the lobsters, by smelling the bake, and by gauging the cooking time which he knows by experience will be required in view of the quantity of food involved and the ambient weather conditions. As an aid in making this determination, the viewing window 48 can be used, a bag of food can be removed through zippered opening 50 for taste and smell sampling, and broth can be drawn through outlet 26 for sampling.

After the cooking has been completed, the cook turns down the burner flame and removes the hood completely. The food can be left in its stack for a considerable period of time while the unit acts as a large chafing dish.

It will be appreciated that this invention functions so well mainly because of its use of the flexible, inflatable hood 44 instead of the conventional fixed cover. Hood 44 is less expensive to manufacture, is lighter in weight, has a greater interior volume, folds for storage or transport, washes more easily, can be made partially or entirely transparent, and can be made disposable. This hood feature, when combined with the other features described herein, produces a cooking unit which is superior to those units of which applicant is aware.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:
1. A cooking apparatus comprising:
   a. a cooking vessel having a hollow interior portion shaped to hold liquid;
   b. means for supporting said cooking vessel;
   c. means for heating the hollow interior portion of said cooking vessel, and
   d. a flexible, inflatable hood affixed around said cooking vessel to enclose and retain heat in the interior of said cooking vessel.

2. The cooking apparatus of claim 1 wherein said supporting means is mounted on the exterior surface of said cooking vessel and includes at least three legs which extend downwardly to contact the ground.

3. The cooking apparatus of claim 1 wherein said heating means includes a burner mounted to heat the exterior surface of said cooking vessel, a container of propane fuel, and a valved conduit connecting said burner to said fuel container.

4. The cooking apparatus of claim 1 wherein said cooking vessel is provided with a fluid outlet positioned in the hollow interior portion thereof.

5. The cooking apparatus of claim 4 wherein said fluid outlet is a vertical tube extending through said vessel, said tube having one open end spaced above the lowest point of the hollow interior portion of said vessel, and having its other open end spaced below the exterior surface of said vessel.

6. The cooking apparatus of claim 4 wherein said cooking vessel supporting means is provided with a broth container support located to position a broth container beneath said fluid outlet.

7. The cooking apparatus of claim 1 further characterized by an open-ended meshwork food retaining cylinder supported within the interior of said cooking vessel, the axis of said cylinder being vertically oriented.

8. The cooking apparatus of claim 7 further characterized by an apertured food supporting plate supported horizontally within the interior of said cooking vessel, and spaced above the lowest point of the hollow interior portion of said vessel.

9. The cooking apparatus of claim 8 wherein the axes of said food retaining cylinder and said food supporting plate are in substantial alignment.

10. The cooking apparatus of claim 1 wherein said hood is removably affixed to the rim of said cooking vessel.

11. The cooking apparatus of claim 1 wherein said hood is provided with an auxiliary hood opening means located at its uppermost portion.

12. The cooking apparatus of claim 1 wherein said hood is provided with a transparent portion to permit visual observation of the interior of said hood.

13. The cooking apparatus of claim 1 wherein said hood is constructed of a sufficiently porous material to permit a small amount of pressurized steam to escape therethrough from the interior of said hood.

14. The cooking apparatus of claim 1 wherein said hood is constructed in the form of a cylinder having a closed top end and an open lower mouth.

15. The cooking apparatus of claim 1 wherein said hood is affixed to the rim of said cooking vessel by a looped flexible band of resilient material which urges the mouth of said hood against the interior surface of the cooking vessel rim.

16. The cooking apparatus of claim 10 wherein said removable hood is foldable for storage and portability.

* * * * *